(12) United States Patent
Hansen et al.

(10) Patent No.: US 7,877,745 B2
(45) Date of Patent: Jan. 25, 2011

(54) DISTRIBUTED QUERY OF REAL WORLD OBJECTS

(75) Inventors: Magne Hansen, Eskilstuna (SE); Thomas Pauly, Västerås (SE); Johan Andersson, Västerås (SE)

(73) Assignee: ABB AB, Västerås (SE)

( * ) Notice: Subject to any disclaimer, the term of this patent is extended or adjusted under 35 U.S.C. 154(b) by 875 days.

(21) Appl. No.: 10/539,275

(22) PCT Filed: Dec. 16, 2003

(86) PCT No.: PCT/SE03/01983

§ 371 (c)(1),
(2), (4) Date: Jan. 30, 2006

(87) PCT Pub. No.: WO2004/057470

PCT Pub. Date: Jul. 8, 2004

(65) Prior Publication Data

US 2006/0129682 A1    Jun. 15, 2006

(30) Foreign Application Priority Data

Dec. 19, 2002 (SE) .................................. 0203780

(51) Int. Cl.
G06F 9/44 (2006.01)
G06F 9/445 (2006.01)
G05B 15/00 (2006.01)

(52) U.S. Cl. ........................... 717/178; 700/1; 717/173; 719/316

(58) Field of Classification Search ................. 717/173, 717/718, 178; 718/106; 719/315, 316, 328, 719/330–332; 700/1
See application file for complete search history.

(56) References Cited

U.S. PATENT DOCUMENTS

| | | | |
|---|---|---|---|
| 6,170,007 B1 | 1/2001 | Venkatraman et al. | |
| 6,400,997 B1 | 6/2002 | Rapp, III | |
| 6,640,140 B1 * | 10/2003 | Lindner et al. | 700/18 |

FOREIGN PATENT DOCUMENTS

| | | |
|---|---|---|
| WO | WO 99/44123 A1 | 9/1999 |
| WO | WO 0077653 A1 | 12/2000 |
| WO | WO 0102953 A1 | 1/2001 |

OTHER PUBLICATIONS

Varadarajan et al. "Componentxchnage: An E-Exchange for Software Components" IADIS (pp. 1-13).*

(Continued)

*Primary Examiner*—Andy Ho
*Assistant Examiner*—Charles E Anya
(74) *Attorney, Agent, or Firm*—Venable LLP; Eric J. Franklin

(57) ABSTRACT

A look-up function and query capability of aspects associated with aspect objects is enabled in a client device. A web client application, such as a web browser, executes in the client device. The aspects are associated with functions of real world objects such as pumps, motors, mixing units, compressors, conveyors, transformers or switchgears. The client device does not need to be pre-loaded with any specific software relating to a control system other than the web browser.

12 Claims, 5 Drawing Sheets

OTHER PUBLICATIONS

H.D. Hofmann and J. Stynes; Implementation reuse and inheritance in distributed component systems; IEEE Xplore; Computer Software and Applications Conference, 1998. COMPSAC '98. Proceedings. The Twenty-Second Annual International; Aug. 19-21, 1998; pp. 496-501 Vienna Austria.

J. Grundy; Storage and retrieval of software components using aspects; IEEE Xplore; Computer Science Conference, 2000. ACSC 2000. $23^{rd}$ Australasian; Jan. 31-Feb. 3, 2000; pp. 95-103; Canberra, ACT Australia.

* cited by examiner

DISTRIBUTED QUERY OF REAL WORLD OBJECTS

TECHNICAL FIELD

The present invention is concerned with control systems where real world objects are represented as Aspect Objects. The method and the system according to the invention are particularly suitable for use in industrial plants of industries such as a chemical, pharmaceutical, food, metal, mines, building material, pulp and paper. Other industries and utilities where the invention is particularly useful are automotive, consumer products, power generation, power distribution, waste water handling, oil refineries, pipelines and offshore platforms.

BACKGROUND ART

WO00102953, hereby incorporated by reference, entitled "Method of integrating an application in a computerized system" describes a method to represent real world objects (referred to as real world entities in WO00102953) in a computerized system in a systematic way, in which different types of information about the real world object may be obtained, linked to the real world object, processed, displayed and acted on. In WO00102953 a real world object is represented by a certain kind of software object called a composite object. Each application integrated in the computerized system defines interfaces that are independent of the implementation of the application itself. These interfaces may be used by other applications, implementing other aspects or groups of aspects of a composite object (hereinafter in this description a composite object is referred to as an Aspect Object), such that the applications can co-operate to provide a functionality for the representation of a real world object that is the sum of all aspects. A problem with the method disclosed in WO00102953 is that it does not disclose how to resolve access to an Aspect of an Aspect Object based on Internet technology.

U.S. Pat. No. 6,170,007 describes how a web server in a device provides access to the user interface functions for the device through a device web page. A network interface in the device enables access to the web page by a web browser such that a user of the web browser accesses the user interface functions for the device through the web page. A remaining problem is how to get access from a web browser to different functions of a real world object represented as an Aspect Object, such as a CAD-drawing or maintenance record of the device, where the functionality resides in a number of unrelated applications.

U.S. Pat. No. 6,400,997 describes an apparatus and a method for factory automation and tracking with focus on a factory automation apparatus, which includes a plurality of portable tablets and an automation server in a wireless communication.

There are a number of enabling technologies, which enable remote access across a network. Examples of such technologies are RPC (Remote Procedure Calls), DCOM (Distributed COM) and CORBA (Common Object Request Broker Architecture). Another example of a technology enabling remote access to objects by use of Internet technologies is called Web Services.

WO 0077653A1 describes a method and apparatus for providing network services. The description relates how HTTP (Hypertext Transfer Protocol) may be used, including the HTTP methods GET and POST to provide input data for a web service. The description also includes such functions as one called a Web Service Provider and one called a Web Services Directory. The latter function provides information about which web services are available and where they may be found. A remaining problem is to enable access to an Aspect of an Aspect Object from a World Wide Web presentation means, which Aspect represents a function or facet of a real world object connected to a control system, such as an industrial control system.

SUMMARY OF THE INVENTION

The object of the present invention is to enable a web client application to access a function of a real world object represented as an Aspect Object in a Control System.

This object is achieved by a method to enable access to a function of a real world object represented as an Aspect Object in a Control System, the method comprising calling a Control System from a web client application in a client device, downloading from the Control System a representation of the Aspect Object and Aspects associated with the Aspect Object, downloading from the Control System a representation of an Aspect Category and an Aspect Type, and downloading a representation of an Aspect System Object to the client device wherein a function of the real world object is enabled for access. Compared to the prior art this enables a user of the client device to easily access functions of a large number of real world objects represented as Aspect Objects from the client device which does not need to be pre-installed with software referring to Aspect Objects, Aspects, Aspect Types or Aspect System Objects of the Control System.

It should be appreciated that since the query for a reference to an interface of the Aspect System Object and an associated table look-up is performed in the client device, instead of in the Control System, the Control System is more efficiently used, which provides for increased reliable control of the real world objects.

Another object of the invention is to provide a computer program that causes a computer or processor to carry out one or more steps of the above described method.

Yet another object of the invention is to provide a computer readable medium having a program recorded thereon, where the program is capable of making a computer perform any of the steps in the above described method.

Another object of the invention is to provide a control system for access of a function of a real world object associated as an Aspect of an Aspect Object, the Control System comprising means for handling a call from a client device external to the Control System, means for downloading to the client device a first software component comprising a representation of the Aspect Object and an Aspect associated with the Aspect Object, means for downloading to the client device a second software component, which second software component comprises a representation of an Aspect Category and an Aspect Type and means for downloading an Aspect System Object to the client device wherein a function of the real world object is enabled for access.

BRIEF DESCRIPTION OF THE DRAWINGS

The present invention will be described in more detail in connection with the enclosed schematic drawings.

DETAILED DESCRIPTION OF THE INVENTION

Figure 1:
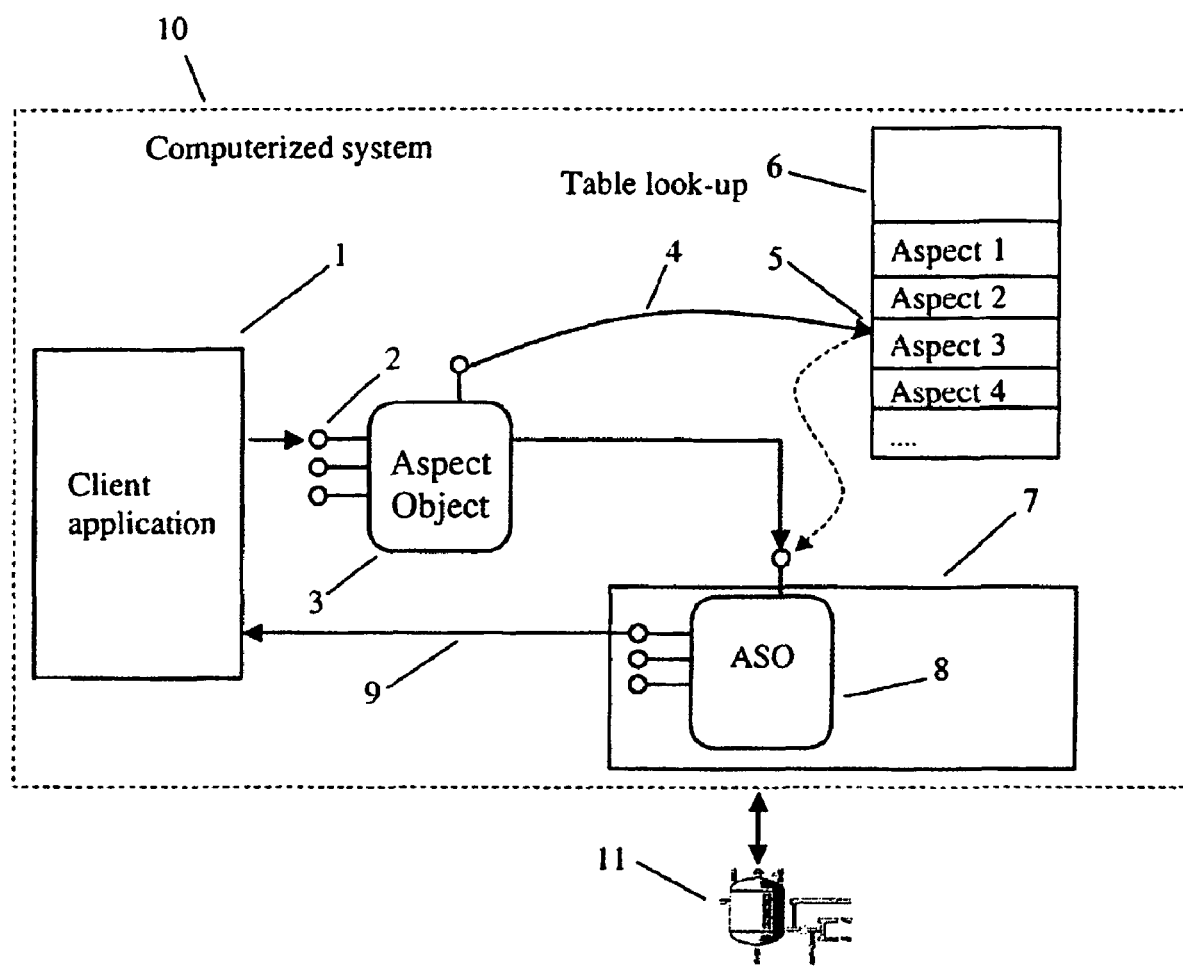
FIG. 1 shows an overview of a method according to the prior art.

In order to appreciate the invention it is beneficial to study some specific prior art. WO00102953 describes a method for integration of many and various types of applications in a computerized system, based on a concept where real world objects are represented as Composite Objects. Examples of a real world objects are a valve, a transmitter, an actuator or a sensor. An example of a more complex real world object is a mixing unit, a motor, a compressor, a reactor, a boiler, a conveyor, a switchgear unit or an industrial robot. Yet another example of a real world object is a product, a raw material or a production batch. A Composite Object is in this application referred to as an Aspect Object. Different functions or facets of a real world object, such as its physical location, the current stage in a process, a control function, an operator interaction, a simulation model, some documentation about the real world object are described as different Aspects of the Aspect Object. Each Aspect Object is a container for one or more Aspects. An Aspect Object is not an object in the traditional meaning of object-oriented systems, but rather a container of references to such traditional objects, which implement the different Aspects. FIG. 1 shows a schematic overview of how according to the prior art a client application 1 in a computerized system 10 gets access to a function associated with an Aspect of an Aspect Object 3 representing a real world object 11. The client application 1 queries an Aspect Object 3 for a reference to an interface that provides the function. The client application queries the Aspect Object 3 by invoking a method of a known interface 2 of the Aspect Object 3. A typical name of such of a method of such an interface 2 is QueryAspectInterface. In the system according to the prior art a reference to an interface of an Aspect System Object 8 is found by means of a Table look-up 4, the reference is returned to the client 9. An Aspect System Object 8 is, for example, a COM object that provides access to at least part of the functionality of an Aspect. According to the prior art objects are, for example, identified by class identifiers (CLSID) and interfaces are, for example, identified by interface identifiers (IID). An Aspect System Object is initialized with a reference (i.e. a pointer) to an Aspect. The Aspect System Object 12 may contain several references of interfaces, which enable access to traditional objects and software applications.

Figure 2:
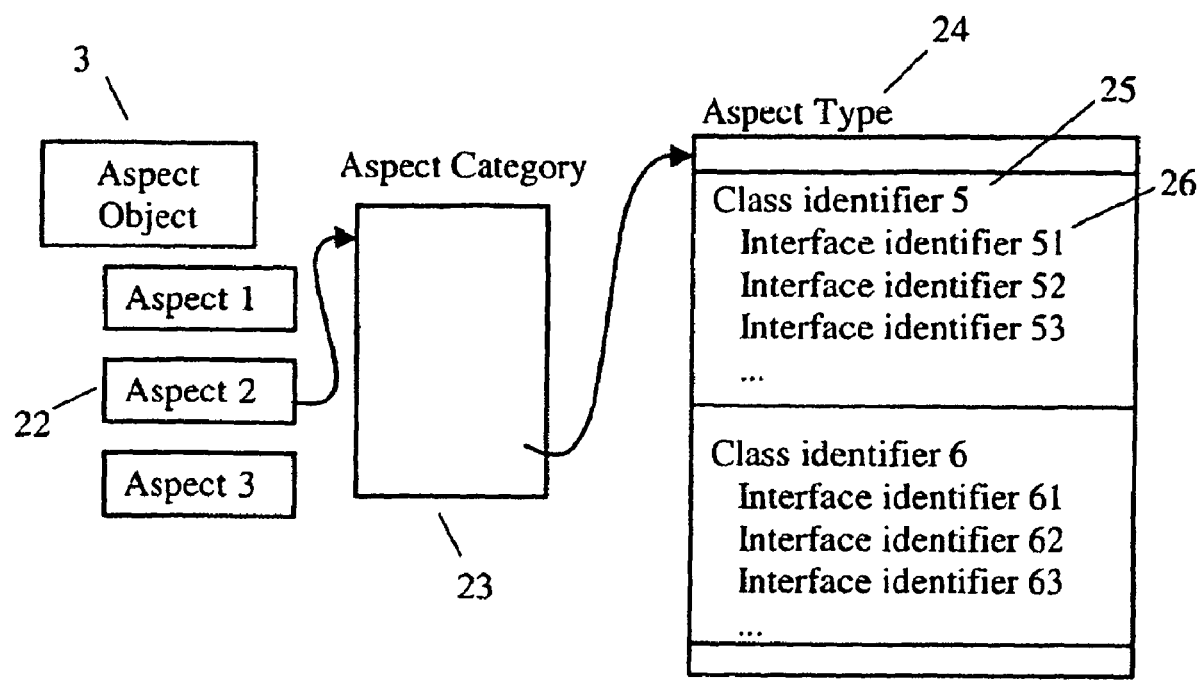
FIG. 2 shows a more detailed overview of the table look-up of a method according to the prior art.

FIG. 2 shows the mechanism of the table look-up 4, according to the prior art, in more detail. According to the prior art the mechanism for finding a reference to an interface of an Aspect System Object 8 involves that a client application 1 queries an Aspect Object 3 for a reference to an interface. FIG. 2 shows that the Aspect Object 3 examines its Aspects, including Aspect2 22 through the Aspect Category 23. An Aspect Category 23 identifies the Aspect Type 24, which describes a piece of a software application, which is integrated in the computerized system. Such a piece of a software application may for instance implement methods associated with functions of a real world object 11. Examples of such functions are open, close, start, move, mix or heat. Examples of more complex functions are "disconnect phase fault" or "adapt to second type of car body". Access to functions through interfaces of Aspect System Objects according to the prior art involves instantiation of Aspect System Objects, Composite Objects, the Aspect Category, and the Aspect Type, implemented, for example, as COM objects. Such instantiations are made in clients and servers of an Aspect based computerized system 10, such as a Control System. A drawback with prior art is that it requires software, such as for example dll's (dynamic link libraries) to be preinstalled in the client devices hosting the client application 1.

Figure 3:
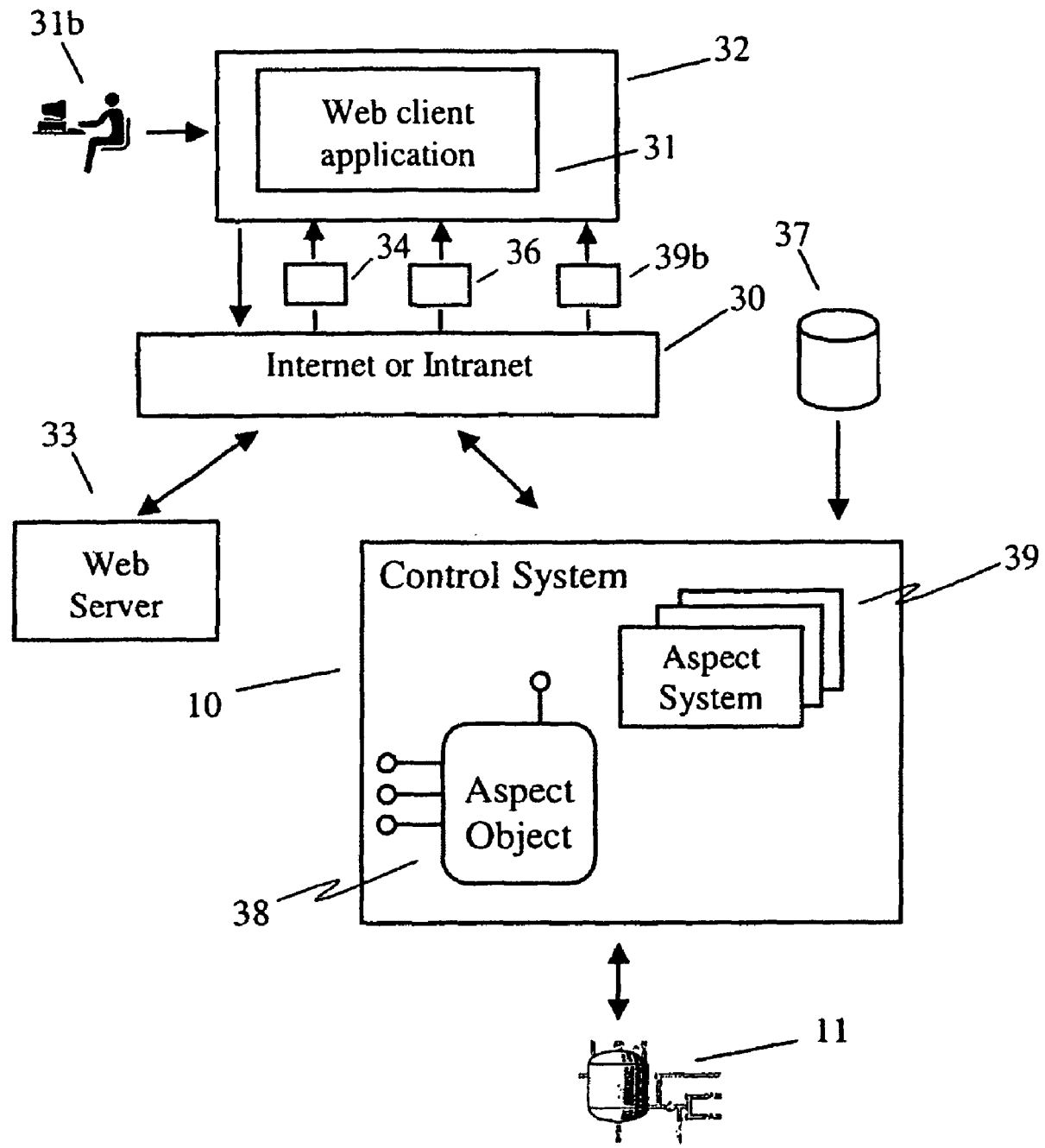
FIG. 3 shows an overview of a method according to the invention, a web server and a user of an Internet client application who intends to access a function of a real world object.

FIG. 3 shows an overview of a method according to the present invention. The method enables access to an Aspect of an Aspect Object from a web client application, such as a web browser, which executes in a client device, without requiring that the client device 32 is pre-installed with any software other than the web client application 31. A web client application is any software application that is intended for general use on an Intranet or Internet 30, hence a web browser is an example of a web client application. An instance of the Aspect Object 38 resides in a control system 10, which comprises at least one Aspect System 39. The Aspect Object 38 may have been instantiated in the Control System before the method is applied. The Control System 10 typically comprises a plurality of Aspect Systems. An Aspect System 39 makes it possible to create and associate Aspects to Aspect Objects 38 in the Control System 10. When a new function is added to the Control System 10, software is typically supplied as an Aspect System 39 to the Control System 10.

FIG. 3 shows an overview of a method according to the invention. A web client application 32, which executes in a client device 31, calls a control system 10 and requests for a representation of an Aspect Object. The Control System comprises at least one Aspect System 39. As an example of how a call can be initiated, a user 31b of the web client application may initiate the call. For instance a process operator may request to access a certain Aspect of an Aspect Object. The call is performed across the Internet or an intranet 30. The call may be divided into a plurality of messages. A first software component 34 is downloaded via the Internet or the intranet 30 to the client device 32. The first software component 34 comprises a representation of the Aspect Object 38 and at its Aspects 39. After the download of the first software component 34 to the client device 32, the Aspect Object 38 represented in the first software component is initialized by the web client application 31. It may also be said that the web client application incarnates the Aspect Object 52. A second software component 36 is also downloaded to the client device 32, which second software component 36 comprises a representation of an Aspect Category 43 and an Aspect Type 44. The information in the first and second software components is used to request a representation of an Aspect System Object that corresponds to the Aspect which is requested by the web client application 31. The control system 10 supports a download of the representation of the Aspect System Object 39b. The downloaded Aspect System Object 51 is initialized in the client device 32.

Figure 4:
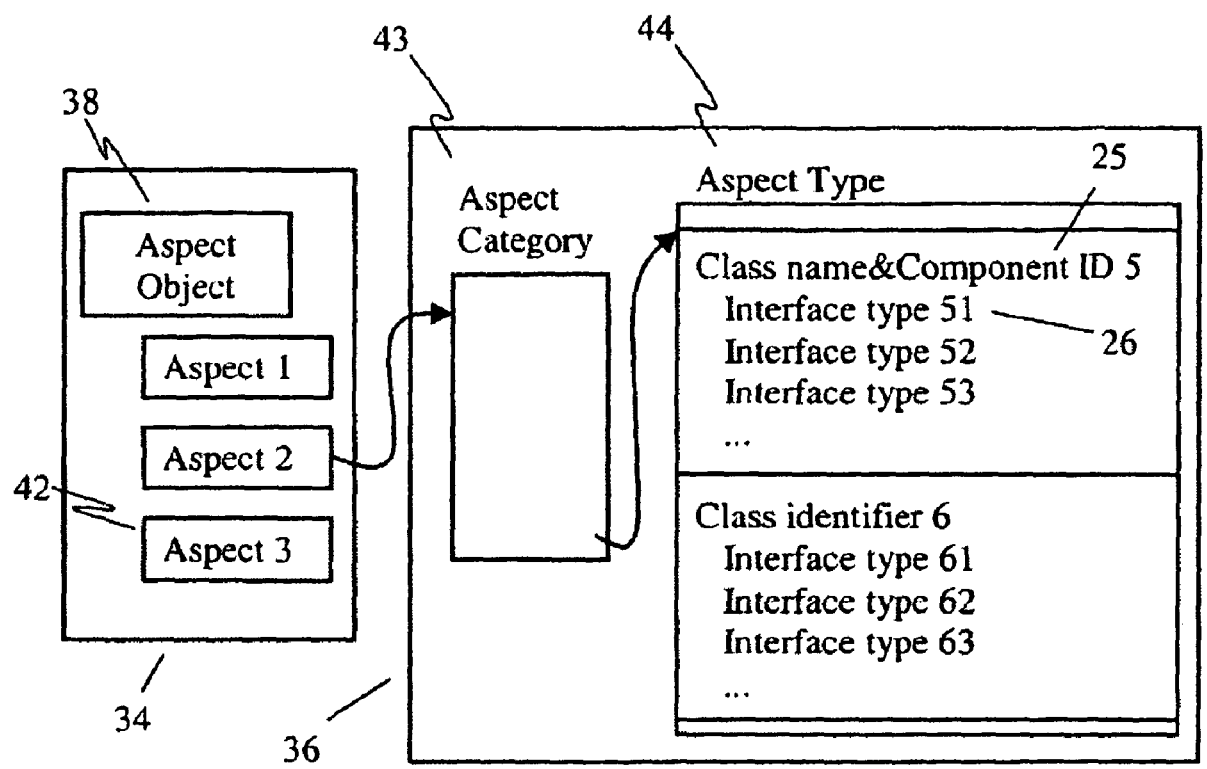
FIG. 4 shows an example of two software components, which, according to the invention, are downloaded to the web client application.

FIG. 4 shows a more detailed representation of the first software component 34 and the second software component 36. FIG. 4 shows that after downloading the first 34 and the second 36 software component to the client device, the client device comprise software capable of performing a table look-up to find a reference to the Aspect System Object that implements the function. The table look-up is initiated by the web client application 31, which calls a method of an interface of the Aspect Object 38. An example of name the method of the interface is QueryAspectInterface. In one embodiment an interface type is passed as a parameter to the Aspect Object 38. The interface type is denoted as a .NET interface type (.NET is a Trademark of Microsoft Inc.). This in contrast to a table look-up according to the prior art, which typically involved an interface type denoted as a COM interface identifier (IID). It should be noted that compared with FIG. 2, FIG. 4 shows that the first and second components are downloaded to the client device, and may exist anywhere on any client device in an intranet or the Internet. This in contrast to the prior art as indicated by FIG. 2, where an Aspect Object and Aspect Type reside within the Control System. In one embodiment of the invention the first software component 34 is downloaded before the second software component 36. In another embodiment the second software component 36 is downloaded before the first software component 34. The software component may also be divided into several packages or messages. As an example the representation of the Aspect Object of the first software component may be sent in a package other than one or several Aspects 42.

Figure 5:
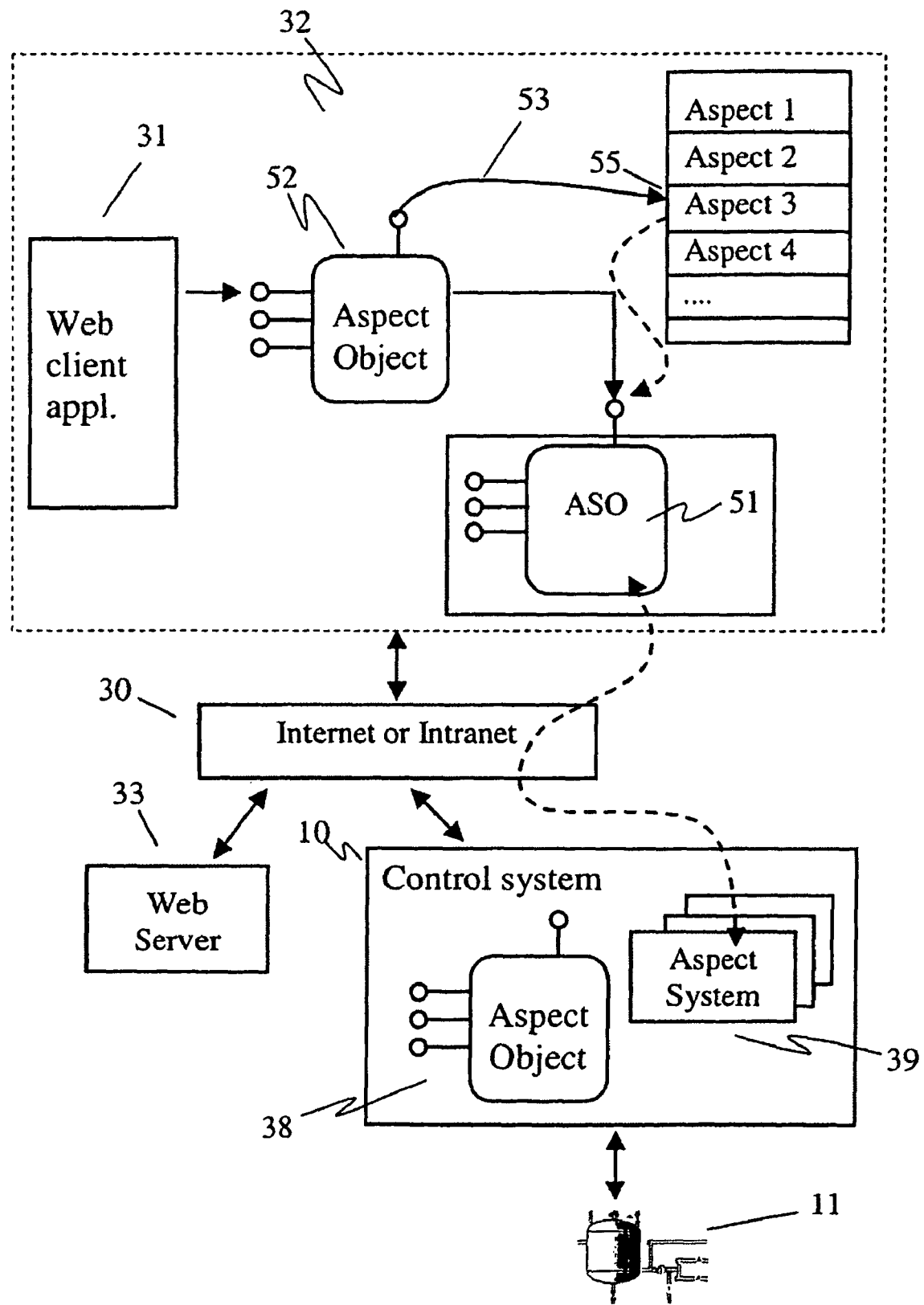
FIG. 5 shows schematically a system based on the invention, where the name look-up of an Aspect is performed in the same computer or computing client device as where the web client application is executing.

FIG. 5 shows schematically a system based on the invention. The system enables a web client application 31 to use a table look-up 53 local to the client device 32, which is a more efficient approach when it comes to using resources of the Control System 10 compared to a system according to the prior art. A user of the web client application 31 may, through a user interface of the client device 32, query an Aspect of the Aspect Object 52 by a reference of an interface of the Aspect System Object 51. A reference of an interface of the Aspect System Object 39 is received 54 by the web client application 31. The Aspect System Object 51 handles the calls to a corresponding Aspect System 39 in the Control System 10, which implements the function. The Aspect System Object 51 previously initialized in the client device 32 provides access to the functions implemented by the Aspect System 39 in the Control System 10. Communication between the Aspect System Object 51 and the Aspect System 39 is, for example, implemented as web services defined in Hyperscript Markup Language (HTML).

The invention claimed is:

1. A method to enable access to a function of a real world object represented as an Aspect Object in an Industrial Control System, which comprises an Aspect System, the method comprising:
    calling an interface of the Aspect Object in the Industrial Control System, through the Internet or an intranet, from a web client application in a client device external to the Control System;
    downloading from the Industrial Control System to the client device a first software object comprising a representation of the Aspect Object and the Aspects associated with the Aspect Object;
    downloading from the Industrial Control System to the client device a second software object comprising a representation of an Aspect Category and an Aspect Type;
    downloading the representation of the Aspect System Object to the client device hosting the web client application based on information associated with the first and second software objects and matching an interface type passed as a parameter with an interface type listed in the Aspect Category and the Aspect type, wherein the function of the real world object is enabled for access;
    initializing the Aspect Object and the Aspect System Object in the client device;
    querying a reference to an interface of the Aspect Object with a web client application in the client device external to the Industrial Control System through the internet or an intranet, wherein the Aspect Object comprises a Composite Object comprising Aspects of the Aspect Object;
    carrying out with the web client application a table look-up local to the client device of a reference to the Aspects of the Aspect Object, wherein the Aspects implement a function of the real world device; and
    implementing with the client the function of the real world object.

2. The method according to claim 1, wherein the web client application is a web browser.

3. The method according to claim 1, further comprising:
    downloading first and second software components to the client device with a web server.

4. The method according to claim 1, wherein a function of the real world object is a start, stop, open or close function.

5. The method according to claim 1, wherein the client device is a personal computer, a mobile phone, a handheld device or a Personal Digital Assistant.

6. A non-transitory computer readable medium, comprising:
    a computer program product including computer program instructions which when run on a computer or a processor cause said computer or processor to carry out a method to enable access to a function of a real world object represented as an Aspect Object in an Industrial Control System, which comprises an Aspect System, the method comprising:
    calling an interface of the Aspect Object in the Industrial Control System, through the Internet or an intranet, from a web client application in a client device external to the Industrial Control System;
    downloading from the Industrial Control System to the client device a first software object comprising a representation of the Aspect Object and the Aspects associated with the Aspect Object;
    downloading from the Industrial Control System to the client device a second software object comprising a representation of an Aspect Category and an Aspect Type;
    downloading the representation of the Aspect System Object to the client device hosting the web client application based on information associated with the first and second software objects and matching an interface type passed as a parameter with an interface type listed in the Aspect Category and the Aspect type, wherein the function of the real world object is enabled for access;
    initializing the Aspect Object and the Aspect System Object in the client device;
    querying a reference to an interface of the Aspect Object with a web client application in the client device external to the Industrial Control System through the internet or an intranet, wherein the Aspect Object comprises a Composite Object comprising Aspects of the Aspect Object;
    carrying out with the web client application a table look-up local to the client device of a reference to the Aspects of the Aspect Object, wherein the Aspects implement a function of the real world device: and
    implementing with the client the function of the real world object.

7. An Industrial Control System for access of a function of a real world object associated as an Aspect of the Aspect Object, the Industrial Control System comprising:
    means for handling a call to an interface of the Aspect Object, through the Internet or an intranet, from a web client application in a client device external to the Industrial Control System;

means for downloading to the client device a first software component, which first software component comprises a representation of the Aspect Object and an Aspect associated with the Aspect Object;

means for downloading to the client device a second software component, which second software component comprises a representation of an Aspect Category and an Aspect Type;

means for downloading an the representation of the Aspect System Object to the client device hosting the web client application based on information associated with the first and second software objects and matching an interface type passed as a parameter with an interface type listed in the Aspect Category and the Aspect type, wherein the function of the real world object is enabled for access;

means for initializing the Aspect Object and the Aspect System Object in the client device;

means for querying a reference to an interface of the Aspect Object with a web client application in the client device external to the Industrial Control System through the internet or an intranet, wherein the Aspect Object comprises a Composite Object comprising Aspects of the Aspect Object;

means for carrying out with the web client application a table look-up local to the client device of a reference to the Aspects of the Aspect Object, wherein the Aspects implement a function of the real world device; and means for implementing with the client the function of the real world object.

8. The Industrial Control System according to claim 7, wherein the web client application is a web browser.

9. The Industrial Control System according to claim 8, wherein the Industrial Control System comprise a web server, which handles the download of the first and second software component to the client device.

10. The Industrial Control System according to claim 7, wherein the function of the real world object is a start, stop, open or close function.

11. The Industrial Control System according to claim 7, wherein the client device is a personal computer, a mobile phone, a handheld device or a Personal Digital Assistant.

12. A method to enable access to a function of a real world object represented as an Aspect Object in an Industrial Control System, which comprises an Aspect System, the method comprising:

calling an interface of the Aspect Object in the Control System, through the Internet or an intranet, from a web client application in a client device external to the Industrial Control System;

downloading from the Industrial Control System to the client device a first software object comprising a representation of the Aspect Object and Aspects associated with the Aspect Object;

downloading from the Industrial Control System to the client device a second software object comprising a representation of an Aspect Category and an Aspect Type;

downloading the representation of the Aspect System Object to the client device hosting the web client application based on information associated with the first and second software objects and matching an interface type passed as a parameter with an interface type listed in the Aspect Category and the Aspect type, wherein the function of the real world object is enabled for access;

downloading an Aspect System Object, wherein downloading the Aspect System Object comprises matching an interface type with an interface type listed in the Aspect Category and the Aspect Type;

initializing the Aspect Object in the client device;

initializing the Aspect System Object in the client device;

querying a reference to an interface of the Aspect Object with a web client application in the client device external to the Industrial Control System through the internet or an intranet, wherein the Aspect Object comprises a Composite Object comprising Aspects of the Aspect Object;

carrying out with the web client application a table look-up local to the client device of a reference to the Aspects of the Aspect Object, wherein the Aspects implement a function of the real world device; and implementing with the client the function of the real world object.

* * * * *